(12) United States Patent
Teshome et al.

(10) Patent No.: US 12,468,553 B2
(45) Date of Patent: Nov. 11, 2025

(54) MANAGING USER PERSONAS USING A MANAGEMENT CONTROLLER

(71) Applicant: Dell Products L.P., Round Rock, TX (US)

(72) Inventors: Abeye Teshome, Austin, TX (US); Vinodkumar Vasudev Ottar, Mckinney, TX (US); Gokul Thiruchengode Vajravel, Bangalore (IN); Bassem El-Azzami, Austin, TX (US); Mohit Arora, Frisco, TX (US); Adolfo Sandor Montero, Pflugerville, TX (US); Richard M. Tonry, Georgetown, TX (US); Rajaravi Chandra Kollarapu, Allen, TX (US); Luis Antonio Valencia Reyes, Waxahachie, TX (US)

(73) Assignee: Dell Products L.P., Round Rock, TX (US)

(*) Notice: Subject to any disclaimer, the term of this patent is extended or adjusted under 35 U.S.C. 154(b) by 110 days.

(21) Appl. No.: 18/498,302

(22) Filed: Oct. 31, 2023

(65) Prior Publication Data

US 2025/0138839 A1    May 1, 2025

(51) Int. Cl.
| | |
|---|---|
| G06F 9/445 | (2018.01) |
| G06F 21/31 | (2013.01) |
| H04L 9/40 | (2022.01) |
| H04L 67/306 | (2022.01) |

(52) U.S. Cl.
CPC ............ *G06F 9/4451* (2013.01); *G06F 21/31* (2013.01); *H04L 63/18* (2013.01); *H04L 67/306* (2013.01)

(58) Field of Classification Search
CPC ....... G06F 9/4451; G06F 21/31; H04L 63/18; H04L 67/306
See application file for complete search history.

(56) References Cited

U.S. PATENT DOCUMENTS

| | | |
|---|---|---|
| 7,599,907 B2 | 10/2009 | Havewala et al. |
| 8,020,192 B2 | 9/2011 | Wright et al. |
| 8,176,336 B1 | 5/2012 | Mao |

(Continued)

FOREIGN PATENT DOCUMENTS

| | | |
|---|---|---|
| WO | 03/090107 A1 | 10/2003 |
| WO | 2021175273 A1 | 9/2021 |
| WO | 2022252857 A1 | 12/2022 |

*Primary Examiner* — Hyun Soo Kim
(74) *Attorney, Agent, or Firm* — WOMBLE BOND DICKINSON (US) LLP

(57) ABSTRACT

Methods and systems for managing data processing systems are disclosed. To manage a data processing of the data processing systems, the data processing system may be placed in a first operating state. To do so, first log in credentials may be obtained from a first user and may be used to obtain a first user persona from a server. The first user persona may be obtained via an out of band communication channel and may include a first set of configurations for the data processing system. The first set of the configurations may indicate preferences for operation of the data processing system associated with the first user. At least a portion of the first set of the configurations may be implemented by hardware resources of the data processing system and, therefore, computer-implemented services may be more likely to be provided as desired by the first user.

20 Claims, 8 Drawing Sheets

(56) References Cited

U.S. PATENT DOCUMENTS

| | | |
|---|---|---|
| 8,490,163 B1 | 7/2013 | Harsell et al. |
| 8,850,186 B2 | 9/2014 | Yamauchi |
| 8,925,028 B2 | 12/2014 | Talbert |
| 9,191,781 B2 | 11/2015 | Kumar |
| 9,246,678 B2 | 1/2016 | Nayshtut et al. |
| 9,349,009 B2 | 5/2016 | Rivera |
| 9,721,111 B2 | 8/2017 | Cavanaugh |
| 9,721,175 B2 | 8/2017 | Kursun et al. |
| 9,785,491 B2 | 10/2017 | Cilfone et al. |
| 10,021,669 B2 | 7/2018 | George |
| 10,163,105 B1 | 12/2018 | Ziraknejad et al. |
| 10,169,571 B1 | 1/2019 | Attfield et al. |
| 10,395,039 B2 | 8/2019 | Khatri et al. |
| 10,439,814 B1 | 10/2019 | Grubin |
| 10,630,489 B2 | 4/2020 | Hughes |
| 10,678,555 B2 | 6/2020 | Johansson et al. |
| 10,841,295 B1 | 11/2020 | Pecen et al. |
| 10,936,712 B1* | 3/2021 | Li .................. H04L 63/1416 |
| 11,563,565 B2 | 1/2023 | Yang et al. |
| 11,704,384 B2 | 7/2023 | Murphy et al. |
| 11,770,456 B1 | 9/2023 | Patel |
| 2007/0006282 A1 | 1/2007 | Durham |
| 2011/0167503 A1 | 7/2011 | Horal |
| 2012/0151512 A1 | 6/2012 | Talbert |
| 2012/0216242 A1 | 8/2012 | Uner |
| 2012/0246704 A1 | 9/2012 | Dorsey |
| 2013/0013727 A1* | 1/2013 | Walker .................. G06F 9/468 |
| | | 709/217 |
| 2013/0318384 A1* | 11/2013 | Yoshihara ............ G06F 1/3203 |
| | | 713/323 |
| 2014/0200884 A1* | 7/2014 | McArthur ............. H04R 25/00 |
| | | 704/206 |
| 2015/0100890 A1* | 4/2015 | Kosmiskas ............... G06F 8/61 |
| | | 715/744 |
| 2016/0301713 A1 | 10/2016 | Krishnamachari |
| 2017/0277876 A1 | 9/2017 | Alameh et al. |
| 2017/0289197 A1 | 10/2017 | Mandyam et al. |
| 2018/0006829 A1 | 1/2018 | Kravitz et al. |
| 2019/0007525 A1* | 1/2019 | Smith, II ............. H04L 63/166 |
| 2019/0156019 A1 | 5/2019 | Chen |
| 2019/0268420 A1 | 8/2019 | Acharya |
| 2020/0007411 A1* | 1/2020 | Arar ........................ G06F 8/31 |
| 2020/0322143 A1 | 10/2020 | Voit |
| 2022/0179958 A1 | 6/2022 | Robison |
| 2022/0222328 A1 | 7/2022 | Talib et al. |
| 2023/0222468 A1 | 7/2023 | Wilson |
| 2023/0222469 A1 | 7/2023 | Wilson |
| 2023/0229512 A1 | 7/2023 | Sawal |
| 2023/0229516 A1 | 7/2023 | Sawal |
| 2023/0229777 A1 | 7/2023 | Pierre |
| 2023/0308266 A1 | 9/2023 | Furch |
| 2023/0379152 A1 | 11/2023 | Ramadasse |
| 2023/0403269 A1 | 12/2023 | Valkaitis |
| 2024/0312515 A1 | 9/2024 | Liao |
| 2025/0047661 A1* | 2/2025 | Berbenetz ............ H04L 67/306 |

\* cited by examiner

MANAGING USER PERSONAS USING A MANAGEMENT CONTROLLER

FIELD

Embodiments disclosed herein relate generally to managing data processing systems. More particularly, embodiments disclosed herein relate to systems and methods to manage user personas for data processing systems using at least a management controller.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
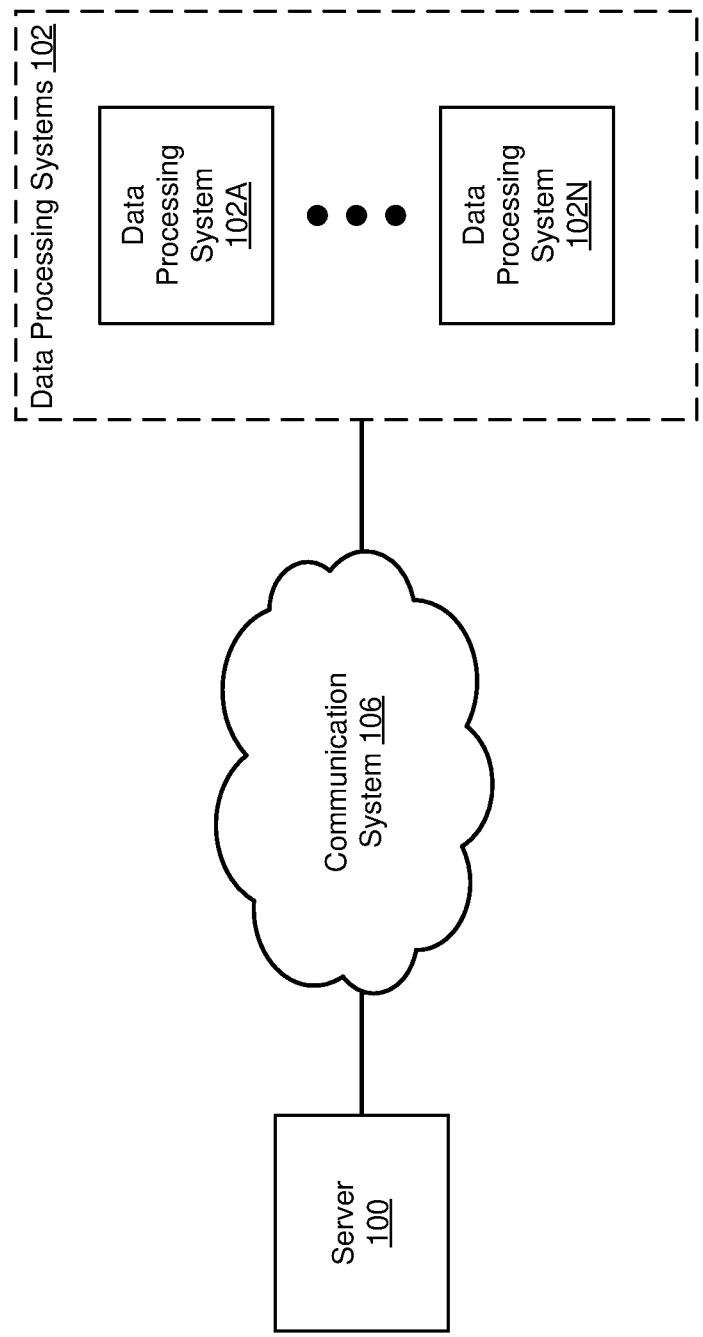
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may provide computer-implemented services to any type and number of other devices and/or users of the data processing systems. The computer-implemented services may include any quantity and type of such services.

To provide the computer-implemented services, the data processing systems may need to operate in a predetermined manner conducive to, for example, execution of applications hosted by the data processing systems that provide the computer-implemented services. The applications may utilize certain configurations of hardware resources and/or software resources to provide the desired computer-implemented services.

The computer-implemented services may be desired by a first user of a data processing system. While using the data processing system, patterns of behavior and/or preferences may be identified for the first user. Configurations of hardware and/or software components of the data processing system may be selected according to the identified behaviors and/or preferences of the first user. Therefore, a likelihood of providing desirable computer-implemented services to the first user may increase due to implementation of the configurations.

However, different users may desire different configurations of the hardware and/or software components. If a second user with a second set of preferences attempted to utilize the data processing system as configured for the first user, a quality of the computer-implemented services may be reduced.

To increase a likelihood of providing the computer-implemented services as desired by a user (e.g., the first user, the second user), a user persona may be generated for each user and stored in a server remote to the data processing system. To do so, the data processing system may include a management controller to independently perform management functionalities for the data processing system.

Upon a log in attempt by the first user to a user access system of the data processing system, the management controller of the data processing system may identify the first user and may request a first user persona corresponding to the first user from the server.

The first user persona may include configurations such as a security profile for the data processing system, user preferences for the data processing system, etc. The configurations may then be implemented so that the data processing system complies (as closely as possible) with the configurations. By doing so, the computer-implemented services may be more likely to be provided to the first user as desired.

In an embodiment, a method of managing data processing systems is provided. The method may include: obtaining, by hardware resources of a data processing system of the data processing systems, first log in credentials associated with a first user of the data processing system; obtaining, by a management controller of the data processing system and based on the first log in credentials, a first identifier, the first identifier being associated with the first user; providing, by the management controller and via an out of band communication channel, the first identifier to a server; obtaining, by the management controller and in response to the providing, a first user persona from the server, the first user persona comprising a first set of configurations for the data processing system based on historical behavior of the first user; providing, by the management controller, the first set of the configurations to the hardware resources; and performing, by the hardware resources, an action set to implement the first set of the configurations to place the hardware resources in a first operating state.

The method may also include: obtaining, by hardware resources of a data processing system of the data processing systems, second log in credentials associated with a second user of the data processing system; obtaining, by a management controller of the data processing system and based on the second log in credentials, a second identifier, the second identifier being associated with the second user; providing, by the management controller and via an out of band communication channel, the second identifier to a server; obtaining, by the management controller and in response to the providing, a second user persona from the server, the second user persona comprising a second set of configurations for the data processing system based on historical behavior of the second user; providing, by the management controller, the second set of the configurations to the hardware resources; and performing, by the hardware resources, an action set to implement the second set of the configurations to place the hardware resources in a second operating state.

The method may also include: monitoring, by the hardware resources, the first operating state to identify a change in the first operating state; updating, by the management controller, the first user persona based on the change in the first operating state to obtain an updated first user persona; and providing, by the management controller, the updated first user persona to the server.

The first set of the configurations may include at least one selected from a list consisting of: a security profile for the data processing system; and user preferences associated with the first user.

Performing the action set may include: identifying, by the hardware resources, a location of the first user; selecting, by the hardware resources, a portion of the first set of the configurations based on the location; and modifying operation of the hardware resources based on the portion of the first set of the configurations.

The data processing system may include a network module adapted to separately advertise network endpoints for the management controller and the hardware resources, the network endpoints being usable by the server to address communications to the hardware resources and the management controller.

The management controller and the network module may be on separate power domains from the hardware resources so that the management controller and the network module are operable while the hardware resources are inoperable.

The out of band communication channel may run through the network module, and an in band communication channel that services the hardware resources may also run through the network module.

The management controller may host a transmission control protocol/internet protocol (TCP/IP) stack to facilitate network communications via the out of band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
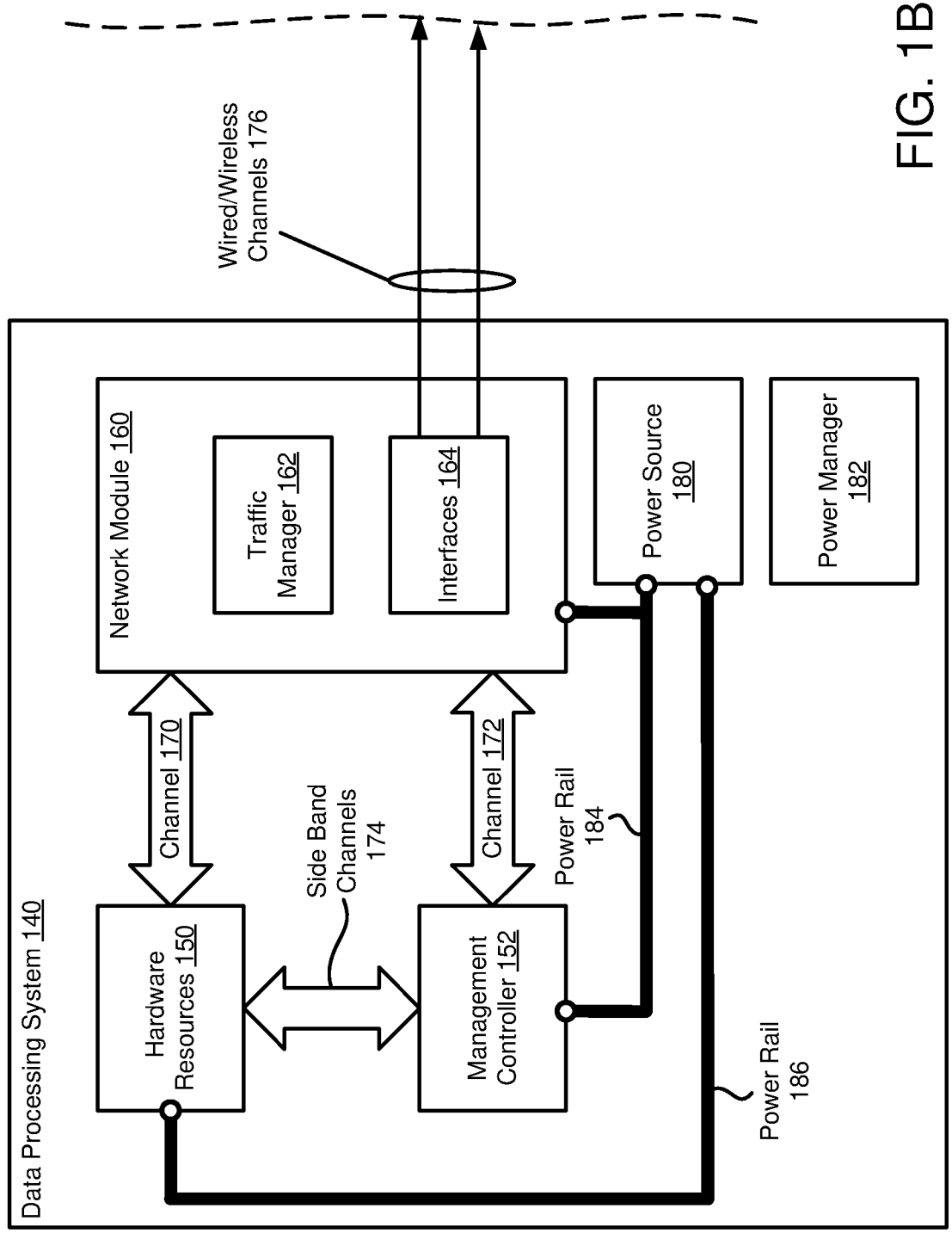
FIG. 1B shows a block diagram illustrating a data processing system in accordance with an embodiment.
Figure 1C:
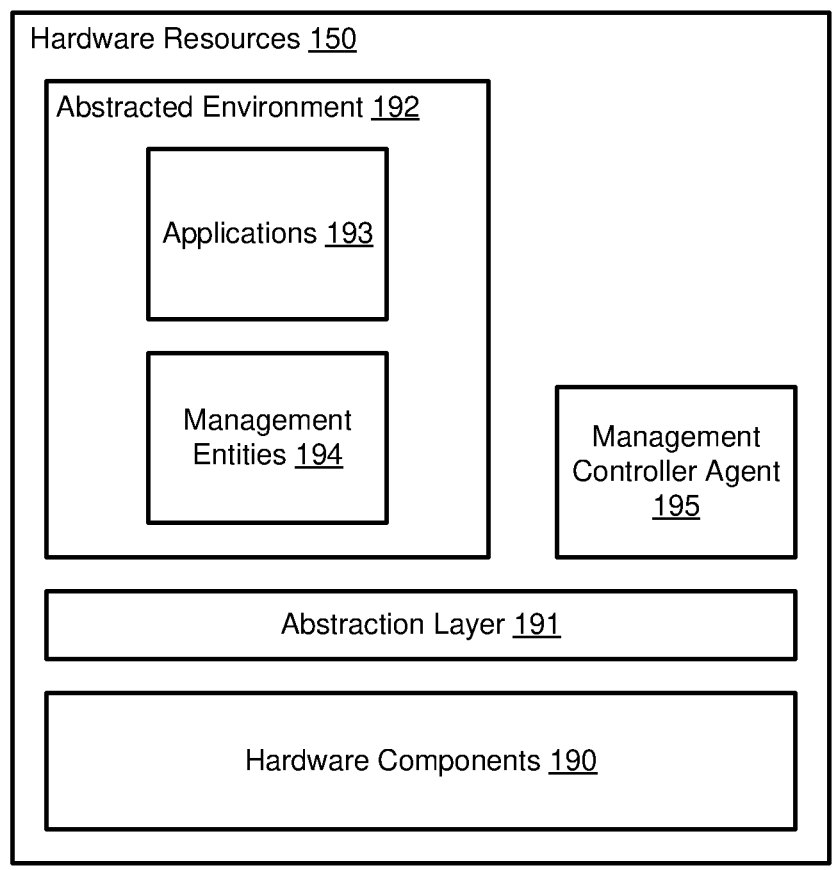
FIG. 1C shows a block diagram illustrating hardware resources of a data processing system in accordance with an embodiment.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing systems 102 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIGS. 1B-1C for additional details regarding data processing systems 102.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, server 100, data processing systems 102, and/or any other type of devices (not shown in FIG. 1A). Other types of computer-implemented services may be provided by the system shown in FIG. 1A without departing from embodiments disclosed herein.

To provide the aforementioned computer-implemented services, any of data processing systems 102 (e.g., 102A, 102N) may need to operate in a predetermined manner. For example, certain hardware components and/or software components may need to be operational for data processing systems 102 to provide a desired type and/or quantity of computer-implemented services. Different configurations of the hardware components and/or software components may be implemented by data processing systems 102 depending on the type and/or quantity of computer-implemented services desired to be provided by the respective data processing systems 102.

Different users may desire different computer-implemented services. To provide computer-implemented services as desired to users of data processing systems 102, different configurations may be implemented based on an identity of a user. Similarly, a user may desire different computer-implemented services for other reasons (e.g., based on a location of the user while operating a data processing system of data processing systems 102).

If a configuration is not implemented when a user operates a data processing system (e.g., 102A), a reduction in quality of the computer-implemented services provided by data processing system 102A may occur.

For example, a first user may log in to data processing system 102A and data processing system 102A may be configured to provide the computer-implemented services as desired by the first user. At another point in time, a second user may log in to data processing system 102A. If the second user desires different configurations of hardware and/or software components of data processing system 102A, the computer-implemented services may be less likely to be provided as desired by the second user.

In general, embodiments disclosed herein relate to systems, devices, and methods for managing data processing systems using user personas. To do so, data processing system 102A may include a management controller. The management controller may operate independently from the hardware resources of data processing system 102A and may be distinct from the hardware resources. Therefore, the management controller may provide management functionalities for data processing system 102A regardless of a status of one or more in band components (e.g., the hardware resources). Refer to FIG. 1B for additional details regarding the management controller.

Upon a log in attempt by a first user to data processing system 102A, the management controller may obtain an identifier for the first user and may provide the identifier to a server (e.g., server 100) via an out of band communication channel. In response, the server may provide the management controller with a first user persona that corresponds to the provided first identifier.

The first user persona may include configurations such as a security profile for the data processing system, user preferences for the data processing system, etc. The configurations may be based on past behavior and/or preferences indicated by the first user. The management controller may provide the configurations to hardware resources of data processing system 102A (e.g., using a side band communication channel) and the hardware resources may configure existing hardware and/or software components of data processing system 102A to comply (as closely as possible) with the configurations. Doing so may place the data processing system in a first operating state.

Over time, the hardware resources may monitor behaviors and/or preferences of the first user to identify changes to the first operating state. When the changes occur, the hardware resources may notify the management controller. The management controller may modify the first user persona to obtain an updated first user persona for the first user and may provide the updated first user persona to the server via the out of band communication channel.

Similarly, if a second user attempts to log in to data processing system 102A, the management controller may obtain a second identifier associated with the second user, may provide the second identifier to server 100, and may receive a second user persona in response from server 100. Configurations included in the second user persona may be implemented to provide computer-implemented services as desired by the second user.

Server 100 may be implemented using a physical device that stores and manages user personas, device registrations, entitlements, and/or other information related to data processing systems 102. For example, server 100 may be a manufacturer of data processing systems 102.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing systems 102 and server 100).

Communication system 106 may include out of band communication channels, in band communication channels, and/or other types of communication channels.

Refer to FIG. 1B for additional details regarding the management controller, network module, out of band communication channel, and/or hardware resources of data processing systems 102.

Turning to FIG. 1B, a diagram illustrating data processing system 140 in accordance with an embodiment is shown. Data processing system 140 may be similar to any of data processing systems 102 shown in FIG. 1A.

To provide computer-implemented services, data processing system 140 may include any quantity of hardware resources 150. Hardware resources 150 may be in band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

In addition, different configurations of hardware resources 150 and/or software resources may be implemented by data processing system 140 based on the type of computer-implemented services that are to be provided. Modifications to configurations of hardware resources 150 and/or the software resources may lead to downtime for data processing system 140 and may consume network bandwidth of channel 170.

To reduce the downtime of data processing system 140 and to reduce the likelihood of the applications and/or other in band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in band components, such as hardware resources 150, of a host data processing system 140). Management controller 152 may provide various management functionalities for data processing system 140. For example, management controller 152 may monitor various ongoing processes performed by the in band component, may manage power distribution, thermal management, and/or other functions of data processing system 140.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may be operably connected to communication components of data processing system 140 via separate channels (e.g., 172) from the in band components, and may implement or otherwise utilize a distinct and independent network stack (e.g., TCP/IP). Consequently, management controller 152 may communicate with other devices independently of any of the in band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in band components and out of band components (e.g., management controller 152) of data processing system. Specifically, an out of band communication channel (e.g., 172) that services management controller 152 and an in band communication channel (e.g., 170) that services hardware resources 150 may run through network module 160. Network module 160 may host a TCP/IP stack to facilitate network communications via the out of band communication channel. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in band components and out of band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in band components. Likewise, outbound traffic from the out of band component may never flow through the in band components.

Specifically, network module 160 may separately advertise network endpoints for management controller 152 and hardware resources 150. The network endpoints may be usable by entities throughout a domain to which data processing system 140 is onboarded to address communications to hardware resources 150 using the in band communication channel (e.g., 170) and management controller 152 using the out of band communication channel (e.g., 172).

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, a radio access network (RAN) card, a wide area network (WAN) card, and/or other types of communication components. These components may support any number of wired/wireless channels 176.

Thus, from the perspective of an external device, the in band components and out of band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

To provide its functionality (e.g., to provide the computer-implemented services), data processing system 140 may: (i) obtain, by hardware resources 150, first log in credentials associated with a first user of the data processing system, (ii) obtain, by management controller 152 and based on the first log in credentials, a first identifier, the first identifier being associated with the first user, (iii) provide, by management controller 152 and via channel 172, the first identifier to the server (e.g., server 100), (iv) obtain, by management controller 152 and in response to the providing, a first user persona from server 100, the first user persona including a first set of configurations for data processing system 140 based on historical behavior of the first user, (v) provide, by management controller 152, the first set of the configurations to hardware resources 150, and/or (vi) perform, by hardware resources 150, an action set to implement the first set of the configurations to place hardware resources 150 in a first operating state.

Figure 2A:
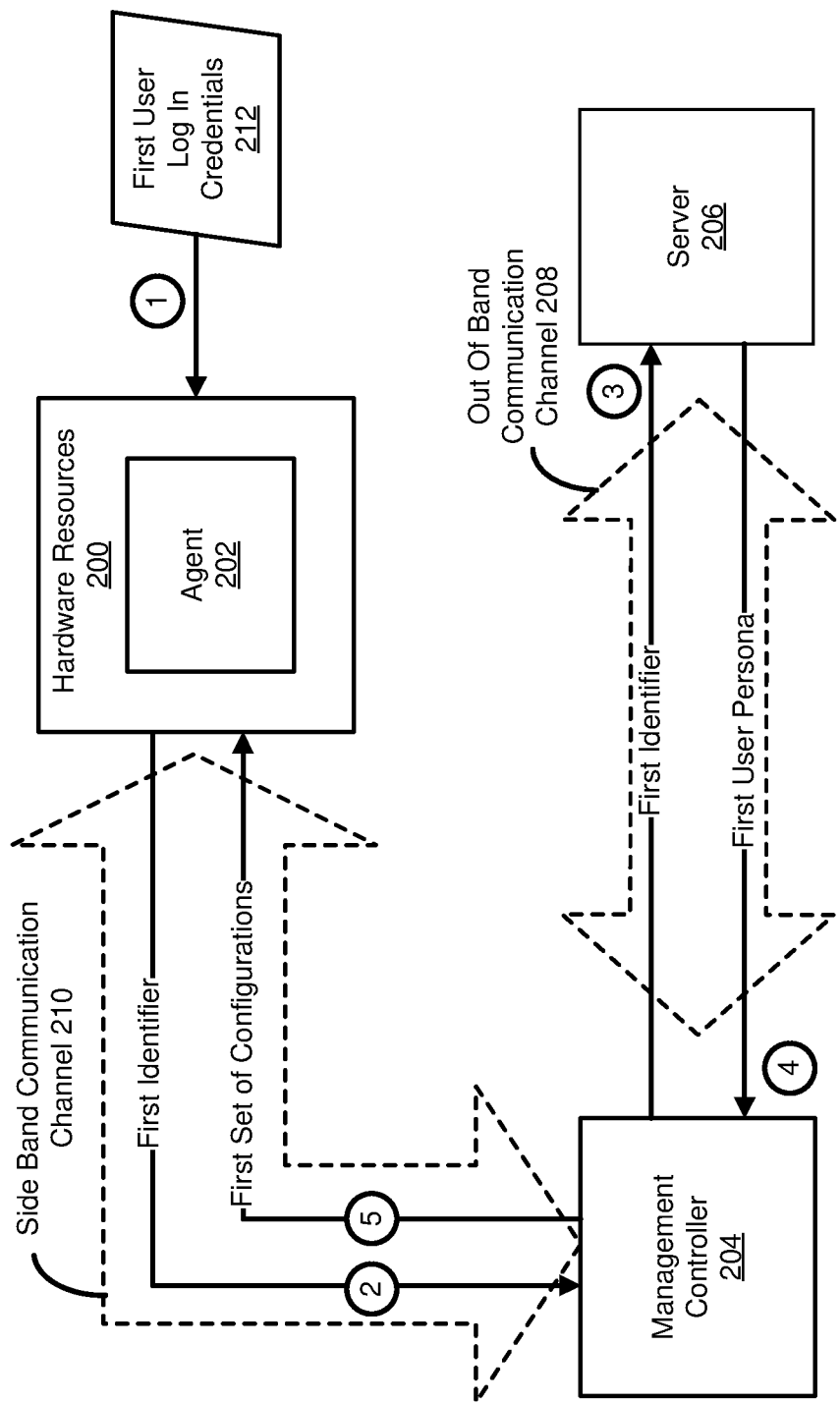
FIG. 2A shows a data flow diagram illustrating a management controller interacting with hardware resources and a server to implement a first set of configurations associated with a first user of a data processing system.
Figure 2B:
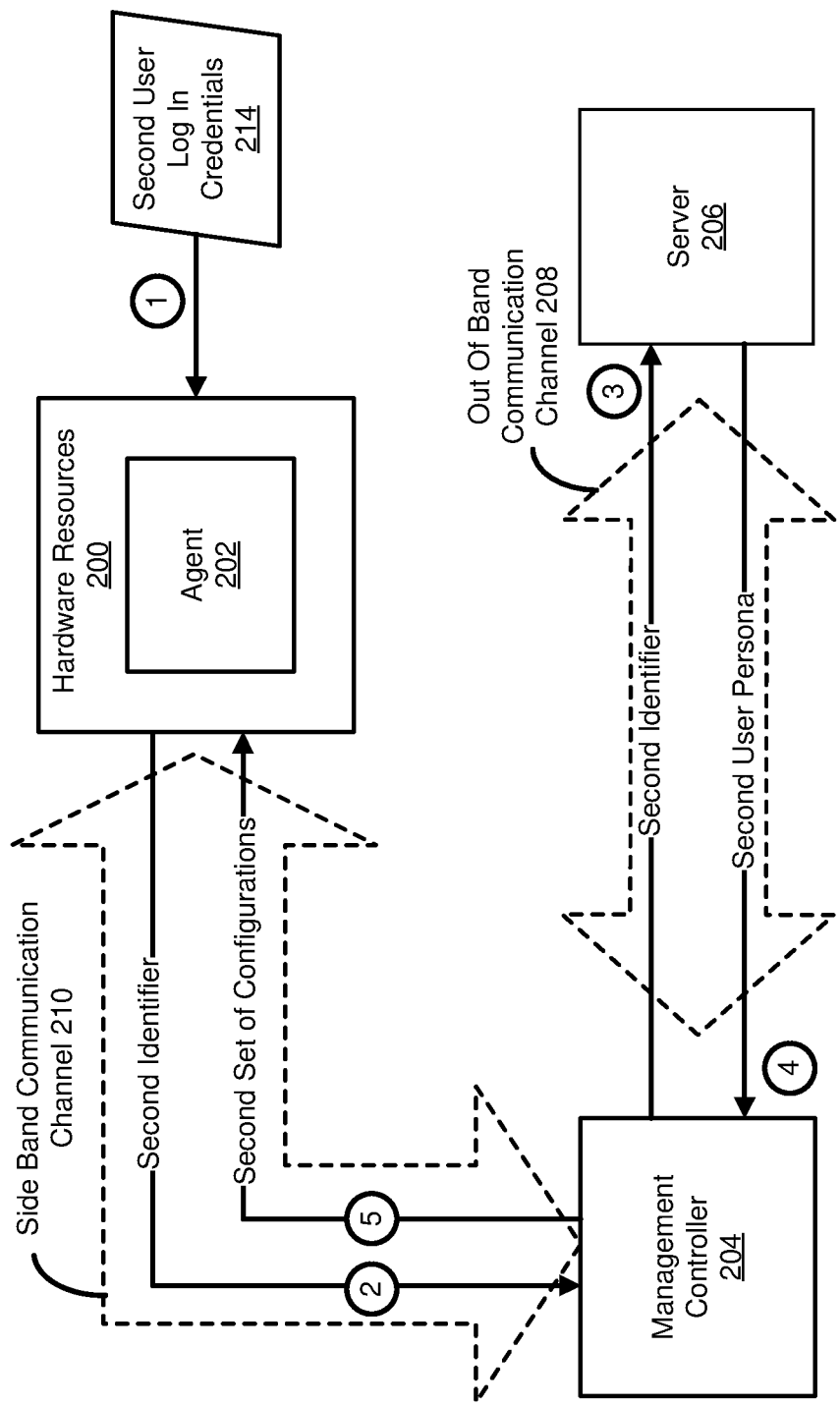
FIG. 2B shows a data flow diagram illustrating a management controller interacting with hardware resources and a server to implement a second set of configurations associated with a second user of a data processing system.
Figure 2C:
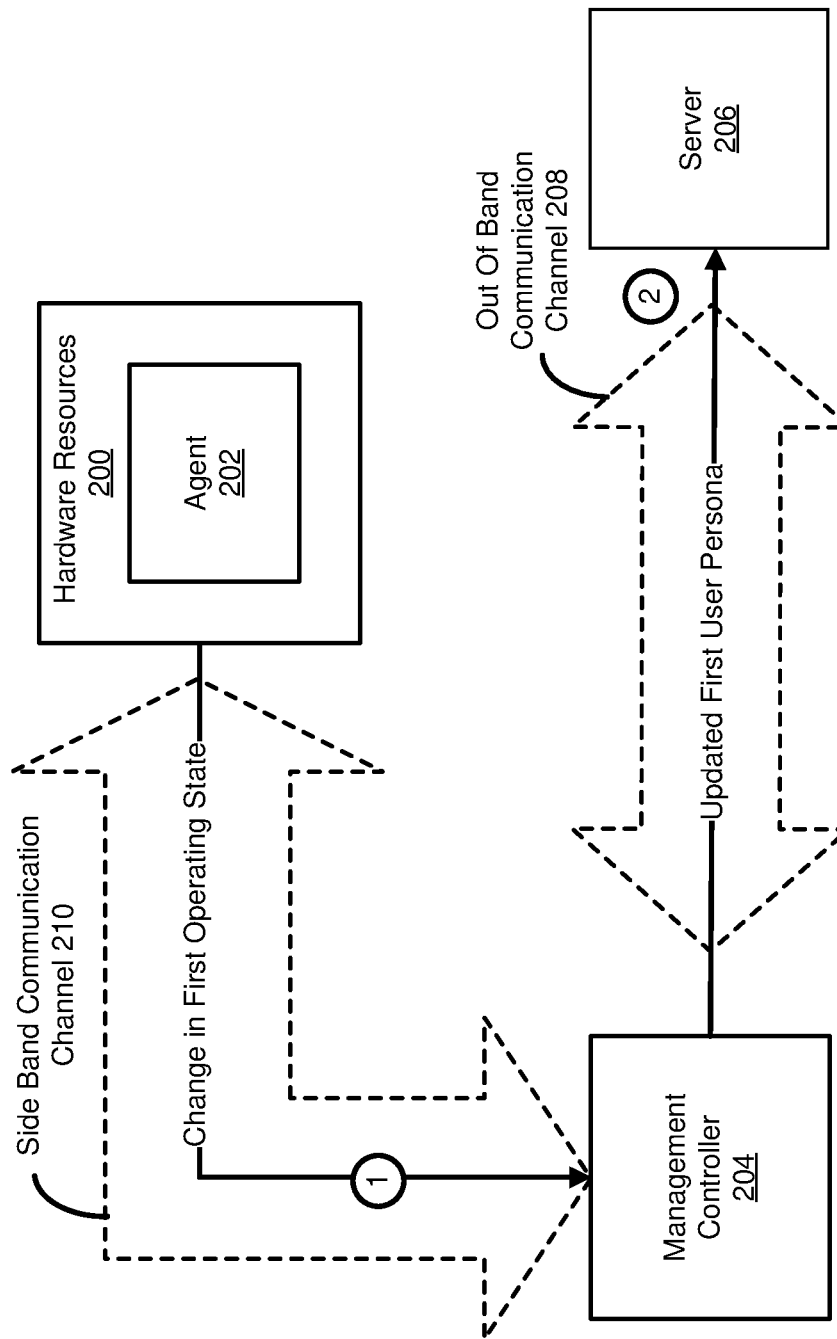
FIG. 2C shows a data flow diagram illustrating a management controller interacting with hardware resources and a server to update a first user persona.
Figure 3:
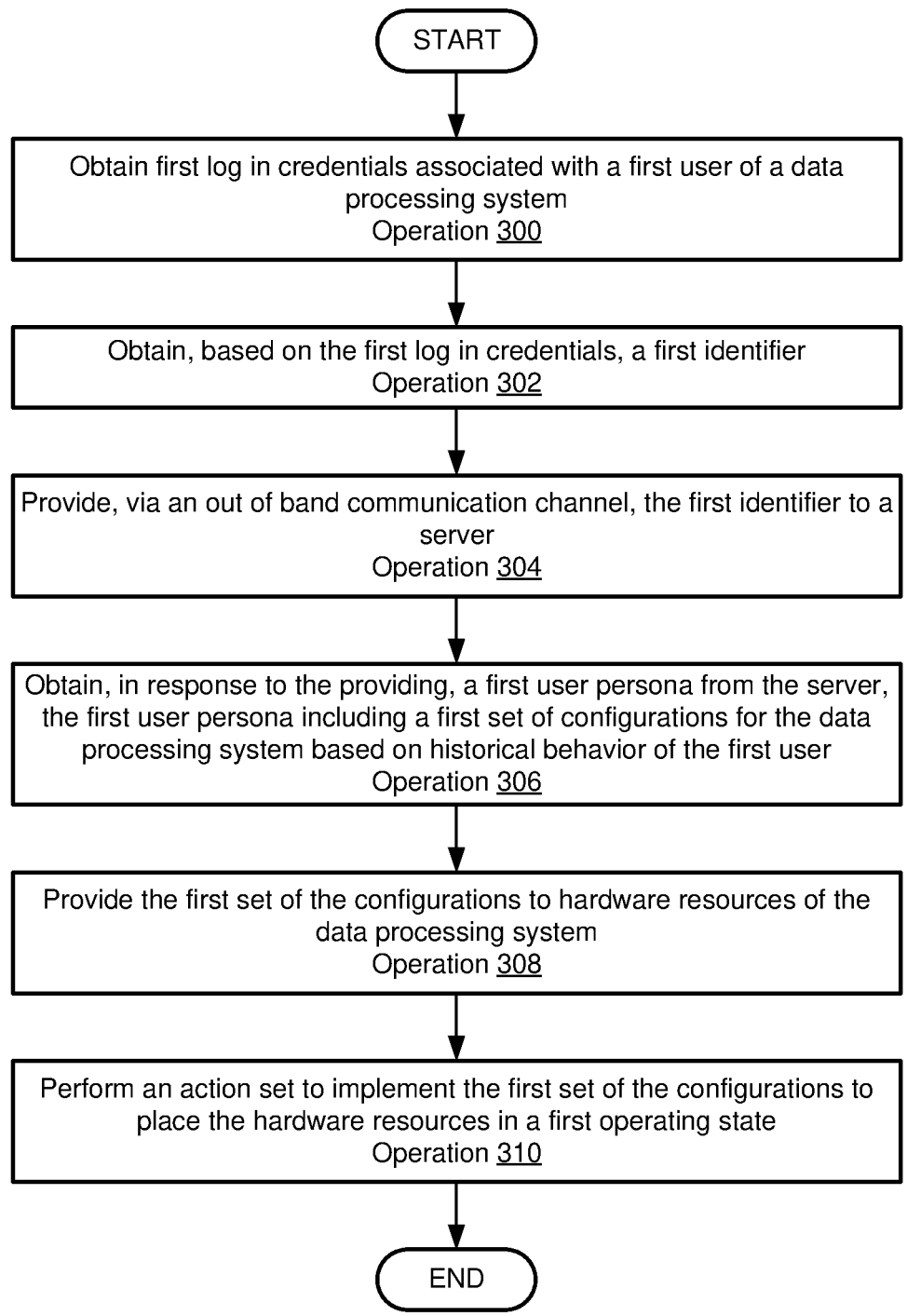
FIG. 3 shows a flow diagram illustrating a method of managing user personas for a data processing system in accordance with an embodiment.

When providing its functionality, components of data processing system 140 may perform all, or a portion, of the methods and operations illustrated in FIGS. 2A-3.

While illustrated in FIG. 1B with a limited number of specific components, a system may include additional, fewer, and/or different components without departing from embodiments disclosed herein.

Turning to FIG. 1C, to provide computer-implemented services, hardware resources 150 may host applications 193 and management entities 194. Management entities 194 may include, for example, drivers, operating systems, and/or other entities that facilitate operation of applications 193 by facilitating use of hardware resources 150. Hardware resources 150 may include processors, memory modules, storage devices, and/or other types of hardware components usable to provide computer-implemented services.

Applications 193 may provide any quantity and type of computer-implemented services using hardware components 190. When operating, applications 193 may use abstracted access to the functionality of hardware components 190 provided by management entities 194. For example, the applications may make calls to an operating system which in turn makes calls to drivers which in turn communicate with the hardware components to invoke their various functionalities.

In an embodiment, hardware resources 150 also hosts abstraction layer 191. Abstraction layer 191 may include software such as hypervisors, dockers, and/or other entities that provide abstracted access to hardware components to various abstracted environments (e.g., 192). The abstracted environments may include virtual machines, containers, etc. Through abstraction layer 191 and abstracted environments, hardware resources 150 may host various instances of management entities and applications that may utilize the functionalities of hardware components 190.

To facilitate cooperation between management controller 152 and hardware resources 150, hardware resources 150 may host management controller agent 195. Management controller agent 195 may be independent from the abstracted environments, and may facilitate communication with and performance of instructions by management controller 152.

For example, management controller agent 195 may include functionality to (i) monitor various abstracted environments, and components therein, (ii) identify operating states (e.g., nominal, stalled, in error of various levels of severity), (iii) obtain information regarding the states of the environments such as, for example, content of virtualized memory, processors, logs of operation of various software and/or abstracted hardware components, (iv) write data to and/or otherwise communicate with the entities in the virtualized environments, (v) make modifications to the virtualized environment and/or entities hosted thereby through invocation of various functions of abstraction layer 191 and/or other entities, (vi) adjust distribution of use of hardware components 190 by the abstracted environment, and/or (vii) perform other types of management actions through which information regarding the operation of entities hosted by abstracted environment 192 may be collected.

As discussed above, the components of FIGS. 1A-1C may perform various methods to manage data processing systems. FIGS. 2A-3 may illustrate examples of methods that may be performed by the components of FIGS. 1A-1C. For example, a management controller similar to management controller 152 may perform all or a portion of the methods. In the diagrams discussed below and shown in FIGS. 2A-3, any of the operations may be repeated, performed in different orders, and/or performed in parallel with or in a partially overlapping in time manner with other operations.

FIG. 2A shows a data flow diagram illustrating a management controller interacting with a server and hardware resources to implement a first set of configurations associated with a first user of a data processing system in accordance with an embodiment. The data flow diagram may illustrate implementation of the first set of the configurations for a data processing system similar to data processing system 140 described in FIG. 1B.

In FIG. 2A, circles including numbers are used to indicate operations occurring at different points in time. For example, all operations described with reference to number one (1) may occur at a first point in time and all operations described with reference to the number two (2) may occur at a second point in time after the first point in time. While the operations are provided in an example temporal order (e.g., time point one before time point two), it will be appreciated that the operations may be performed in other orders from those illustrated and described herein.

At time point one (1), hardware resources 200 may obtain first user log in credentials 212. Hardware resources 200 may be similar to hardware resources 150 described in FIG. 1B. First user log in credentials 212 may include a username, password, pin, and/or any other means of verifying an identity of the first user. Hardware resources 200 may obtain first user log in credentials 212 via an interaction through a graphical user interface (GUI) of data processing system 140. For example, the first user may access the GUI on a device (e.g., 140) and may enter a username and password to gain access to the device.

At time point two (2), hardware resources 200 and/or a software agent (e.g., agent 202) hosted by hardware resources 200 may utilize first user log in credentials 212 to obtain a first identifier. The first identifier may include any information usable to identify the first user (e.g., a name, the provided username). The first identifier may be provided, via side band communication channel 210, to management controller 204. Side band communication channel may be similar to any of side band channels 174 described in FIG. 1B.

Management controller 204 may be similar to management controller 152 described in FIG. 1B. At time point three (3), management controller 204 may provide, via out of band communication channel 208, the first identifier to server 206. Server 206 may be similar to server 100 described in FIG. 1A and out of band communication channel 208 may be similar to channel 172 described in FIG. 1B. Server 206 may store any number of user personas associated with different users. Each user persona may include any number of configurations of hardware resources 200 and/or software components hosted by hardware resources 200. The configurations may include: (i) user preferences, (ii) security profiles, and/or (iii) any other configurations. The configurations may be based on historical behavioral patterns of the users, preferences indicated by the users, etc.

Server 206 may utilize the first identifier to obtain a first user persona associated with the first identifier. The first user persona may include configurations based on behaviors and/or preferences of the first user. For example, the first user may prefer a high level of security protection, a particular organization of desktop icons, a particular toolbar when utilizing an internet browser, etc.

At time point four (4), server 206 may provide, via out of band communication channel 208, the first user persona to management controller 204. Management controller 204 may extract a first set of configurations from the first user persona and may provide the first set of the configurations, via side band communication channel 210, to hardware resources 200.

The first set of the configurations may include, for example, different configuration preferences based on factors such as a location of the first user. Specifically, the first user may prefer a first subset of the first set of the configurations when the first user is at work and a second subset of the first set of the configurations when the first user is at home. As an example, the first user may prefer higher security protection when accessing data processing system 140 at work when compared to accessing data processing system 140 at home.

At time point five (5), management controller 204 may provide the first set of the configurations to agent 202 hosted by hardware resources 200. Hardware resources 200 may identify, based on user-provided data and/or other information, the location of the first user. Based on the location of the first user, agent 202 may identify a corresponding subset of the first set of the configurations. Agent 202 may then perform an action set to modify operation of hardware resources 200 to comply (to an extent considered acceptable by the first user) with the subset of the configurations.

Modifying the operation of hardware resources 200 may place data processing system 140 in a first operating state. The first operating state may be associated with the first user and may change over time due to changes in configurations desired by the first user (e.g., refer to FIG. 2C). By doing so, configurations desired by the first user may be implemented following accessing of data processing system 140 by the first user.

Turning to FIG. 2B, a data flow diagram is shown that illustrates a management controller interacting with a server and hardware resources to implement a second set of configurations associated with a second user of a data processing system in accordance with an embodiment. The data flow diagram may illustrate implementation of the second set of the configurations for a data processing system similar to data processing system 140 described in FIG. 1B.

In FIG. 2B, circles including numbers are used to indicate operations occurring at different points in time. For example, all operations described with reference to number one (1) may occur at a first point in time and all operations described with reference to the number two (2) may occur at a second point in time after the first point in time. While the operations are provided in an example temporal order (e.g., time point one before time point two), it will be appreciated that the operations may be performed in other orders from those illustrated and described herein.

Data transmissions and processes performed by entities illustrated in FIG. 2B may be the same as corresponding data transmissions and processes illustrated in FIG. 2A. While described in FIG. 2A with respect to a first user, the data transmissions and processes in FIG. 2B are described in relation to a second user. For example, a data processing system (e.g., 140) may be used by more than one user over time. Each user may provide log in credentials and may access data processing system 140 using their individual log in credentials.

Consider a scenario in which the first user may provide first user log in credentials 212 (described in FIG. 2A), and at a later time, a second user may provide second user log in credentials 214. Therefore, at time point one (1), hardware resources 200 may obtain second user log in credentials 214. Second log in credentials 214 may include a username, password, pin, and/or any other means of verifying an identity of a second user. Hardware resources 200 may obtain second user log in credentials 214 via an interaction through a graphical user interface (GUI) of data processing system 140. For example, the second user may access the GUI on a device (e.g., 140) and may enter a username and password to gain access to the device.

At time point two (2), hardware resources 200 and/or a software agent (e.g., agent 202) hosted by hardware resources 200 may utilize second user log in credentials 214 to obtain a second identifier. The second identifier may include any information usable to identify the second user (e.g., a name, the provided username). The second identifier may be provided, via side band communication channel 210, to management controller 204.

At time point three (3), management controller 204 may provide, via out of band communication channel 208, the second identifier to server 206.

Server 206 may utilize the second identifier to obtain a second user persona associated with the second identifier. The second user persona may include configurations based on behaviors and/or preferences of the second user. For example, the second user may prefer a high level of security protection, a particular organization of desktop icons, a particular toolbar when utilizing an internet browser, etc.

At time point four (4), server 206 may provide, via out of band communication channel 208, the second user persona to management controller 204. Management controller 204 may extract a second set of configurations from the second user persona and may provide the second set of the configurations, via side band communication channel 210, to hardware resources 200.

The second set of the configurations may include, for example, different configuration preferences based on factors such as a location of the second user. Specifically, the second user may prefer a first subset of the second set of the configurations when the second user is at work and a second subset of the second set of the configurations when the second user is at home.

At time point five (5), management controller 204 may provide the second set of the configurations to agent 202 hosted by hardware resources 200. Hardware resources 200 may identify, based on user-provided data and/or other information, the location of the second user. Based on the location of the second user, agent 202 may identify a corresponding subset of the second set of the configurations. Agent 202 may then perform an action set to modify operation of hardware resources 200 to comply (to an extent considered acceptable by the second user) with the subset of the configurations.

Modifying the operation of hardware resources 200 may place data processing system 140 in a second operating state. The second operating state may be associated with the second user and may change over time due to changes in configurations desired by the second user. By doing so, configurations desired by the second user may be implemented following accessing of data processing system 140 by the second user.

Consequently, any user that accesses data processing system 140 may have a corresponding user persona that may be built around their preferences and/or behavior. Doing so may increase a likelihood of providing computer-implemented services as desired by each individual user.

Turning to FIG. 2C, a data flow diagram is shown that illustrates a management controller interacting with a server and hardware resources to update a first user persona in accordance with an embodiment. The data flow diagram may illustrate updates to a first user persona for a data processing system similar to data processing system 140 described in FIG. 1B.

In FIG. 2C, circles including numbers are used to indicate operations occurring at different points in time. For example, all operations described with reference to number one (1) may occur at a first point in time and all operations described with reference to the number two (2) may occur at a second point in time after the first point in time. While the operations are provided in an example temporal order (e.g., time point one before time point two), it will be appreciated that the operations may be performed in other orders from those illustrated and described herein.

As described in FIG. 2A, the first user persona may be implemented to place data processing system 140 in a first operating state when the first user provides first log in credentials 212. By doing so, data processing system 140 may implement configurations based on historical behavior and/or preferences indicated by the first user.

Over time, hardware resources 200 and/or agent 202 may monitor the first operating state to identify a change to the first operating state. For example, agent 202 may obtain data related to behaviors of the first user and/or modifications to preferences indicated by the first user that conflict with configurations included in the first user persona. After identifying the change to the first operating state, at time point one (1), hardware resources 200 may provide the change in the first operating state to management controller 204 via side band communication channel 210.

Management controller 204 may utilize the change in the first operating state to update the first user persona to obtain an updated first user persona. Management controller 204 may provide the updated first user persona to server 206 via out of band communication channel 208. Server 206 may provide the updated first user persona to any data processing system utilized by the first user in place of the first user persona.

By doing so, computer-implemented services provided by data processing system 140 may be more likely to match needs and/or preferences of the first user.

In an embodiment, the one or more entities performing the operations shown in FIGS. 2A-2C are implemented using a processor adapted to execute computing code stored on a persistent storage that when executed by the processor performs the functionality of the system of FIGS. 1A-1C discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIGS. 1A-1C may perform various methods to manage data processing systems. FIG. 3 illustrates methods that may be performed by the components of FIGS. 1A-1C. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing user personas for a data processing system in accordance with an embodiment is shown. The method may be performed, for example, by a data processing system, and/or any other entity.

At operation 300, first log in credentials associated with a first user of a data processing system may be obtained. Obtaining the first log in credentials may include: (i) receiving the first log in credentials from the first user via an interaction with a GUI of the data processing system, (ii) reading the first log in credentials from storage, (iii) receiving, in the form of a message, the first log in credentials from another entity, and/or (iv) other methods. For example, the first user may enter a username and password to the GUI of the data processing system.

At operation 302, a first identifier may be obtained based on the first log in credentials. Obtaining the first identifier may include: (i) performing an identifier lookup process using the first log in credentials as a key for an identifier lookup table and obtaining the first identifier as a result of the identifier lookup process, (ii) providing the first log in credentials to another entity and receiving the first identifier in response to the first log in credentials, the entity being responsible for determining an identifier associated with the first log in credentials, (iii) treating at least a portion of the first log in credentials as the first identifier, and/or (iv) other methods.

At operation 304, the first identifier may be provided to a server via an out of band communication channel. Providing the first identifier may include: (i) encapsulating the first identifier in a data structure, (ii) transmitting the data structure in the form of a message via a network endpoint associated with the out of band communication channel, and/or (iii) other methods.

At operation 306, a first user persona may be obtained from the server in response to the providing, the first user persona including a first set of configurations for the data processing system based on historical behavior of the first user. Obtaining the first user persona may include: (i) receiving a transmission including a message from the server via a network endpoint of the data processing system associated with the out of band communication channel, (ii) reading the first user persona from the transmission, and/or (iii) other methods.

At operation 308, the first set of the configurations may be provided to hardware resources of the data processing system. Providing the first set of the configurations may include: (i) extracting the first set of the configurations from the first user persona, (ii) providing the first set of the configurations, via a message over a side band communication channel of the data processing system, to the hardware resources, and/or (iii) other methods.

At operation 310, an action set may be performed to implement the first set of the configurations to place the hardware resources in a first operating state. Performing the action set may include: (i) identifying a location of the first user, (ii) selecting a portion of the first set of the configurations based on the location, (iii) modifying operation of the hardware resources based on the portion of the first set of the configurations, and/or (iv) other methods.

Identifying the location of the first user may include: (i) reading the location of the first user from storage, (ii) obtaining the location of the first user from metadata generated from the first log in credentials, (iii) receiving the location of the first user from the first user in response to a request for the location of the first user, and/or (iv) other methods.

Selecting the portion of the first set of the configurations may include: (i) performing a filtering process using the first set of the configurations to identify the portion based on corresponding locations associated with each configuration of the first set of the configurations, (ii) obtaining the portion from another entity, (iii) reading the first portion from storage, and/or (iv) other methods.

Modifying the operation of the hardware resources based on the portion of the first set of the configurations may include: (i) providing instructions to a software agent hosted by the hardware resources, the instructions indicating configurations to be implemented by the software agent, (ii) directly modifying operation of one or more hardware components of the hardware resources to implement the portion of the first set of the configurations, and/or (iii) other methods.

The method may end following operation 310.

The operations described in FIG. 3 may support provision of desired computer-implemented services to the first user of the data processing system via implementing configurations that correspond to user preferences for the first user. However, one or more of the configurations preferred by the first user may change over time. To continue providing computer-implemented services as desired by the first user, the first user persona obtained in operation 306 of FIG. 3 may be modified.

Modifying the first user persona may include: (i) monitoring the first operating state to identify a change in the first operating state, (ii) updating the first user persona based on the change in the first operating state to obtain an updated first user persona, and/or (iii) providing the updated first user persona to the server.

Monitoring the first operating state may include: (i) obtaining data collected by one or more software agents hosted by the hardware resources, the data indicating patterns of behavior and/or selected preferences of the user, (ii) comparing the obtained data to corresponding elements of the first operating state to identify whether a change in the first operating state has occurred, and/or (iii) if a change in the first operating state has occurred, providing a message to a management controller of the data processing system indicating the change in the first operating state.

Updating the first user persona may include: (i) modifying a data structure associated with the first user persona to reflect the change to the first operating state, (ii) storing a copy of the updated first user persona in storage, (iii) deleting previous versions of the first user persona, and/or (iv) other methods.

Providing the updated first user persona to the server may include: (i) encapsulating the updated first user persona in a message, the message indicating that the first user persona may be replaced with the updated first user persona, (ii) transmitting the message to the server via a network endpoint of the data processing system associated with the out of band communication channel, and/or (iii) other methods.

By doing so, upon the next log in process by the first user, the data processing system may be provided with the updated first user persona instead of the first user persona. Consequently, the data processing system may be more likely to provided computer-implemented services as desired by the first user.

Consider a scenario in which the data processing system is a device usable by multiple users. For example, the first user may provide the first log in credentials to utilize the data processing system at a first point in time. At a second point in time, a second user may present second log in credentials to utilize the data processing system at a second point in time.

In this scenario, managing the data processing system may include: (i) obtaining second log in credentials associated with the second user of the data processing system, (ii) obtaining, based on the second log in credentials, a second identifier, the second identifier being associated with the second user, (iii) providing the second identifier to the server via the out of band communication channel, (iv) obtaining, in response to the providing, a second user persona from the server, the second user persona including a second set of configurations for the data processing system based on historical behavior of the second user, (v) providing the second set of the configurations to the hardware resources, and/or (vi) performing an action set to implement the second set of the configurations to place the data processing system in a second operating state.

Obtaining the second log in credentials may include: receiving the second log in credentials from the second user via an interaction with a GUI of the data processing system, (ii) reading the second log in credentials from storage, (iii) receiving, in the form of a message, the second log in credentials from another entity, and/or (iv) other methods.

For example, the second user may enter a second username and second password to the GUI of the data processing system.

Obtaining the second identifier may include: (i) performing a second identifier lookup process using the second log in credentials as a key for the identifier lookup table and obtaining the second identifier as a result of the second identifier lookup process, (ii) providing the second log in credentials to another entity and receiving the second identifier in response to the second log in credentials, the entity being responsible for determining an identifier associated with the second log in credentials, (iii) treating at least a portion of the second log in credentials as the second identifier, and/or (iv) other methods.

Providing the second identifier to the server may include: (i) encapsulating the second identifier in a second data structure, (ii) transmitting the second data structure in the form of a second message via a network endpoint associated with the out of band communication channel, and/or (iii) other methods.

Obtaining the second user persona from the server may include: (i) receiving a transmission including a second message from the server via a network endpoint of the data processing system associated with the out of band communication channel, (ii) reading the second user persona from the transmission, and/or (iii) other methods.

Providing the second set of the configurations to the hardware resources may include: (i) extracting the second set of the configurations from the second user persona, (ii) providing the second set of the configurations, via a message over a side band communication channel of the data processing system, to the hardware resources, and/or (iii) other methods.

Performing the action set to implement the second set of the configurations may include methods described in operation 310 to place the data processing system in a second operating state. For example, performing the action set to implement the second set of the configurations may include: (i) identifying a location of the second user, (ii) selecting a portion of the second set of the configurations based on the location, (iii) modifying operation of the hardware resources based on the portion of the second set of the configurations, and/or (iv) other methods. Refer to operation 310 for additional details regarding performing the action set.

Figure 4:
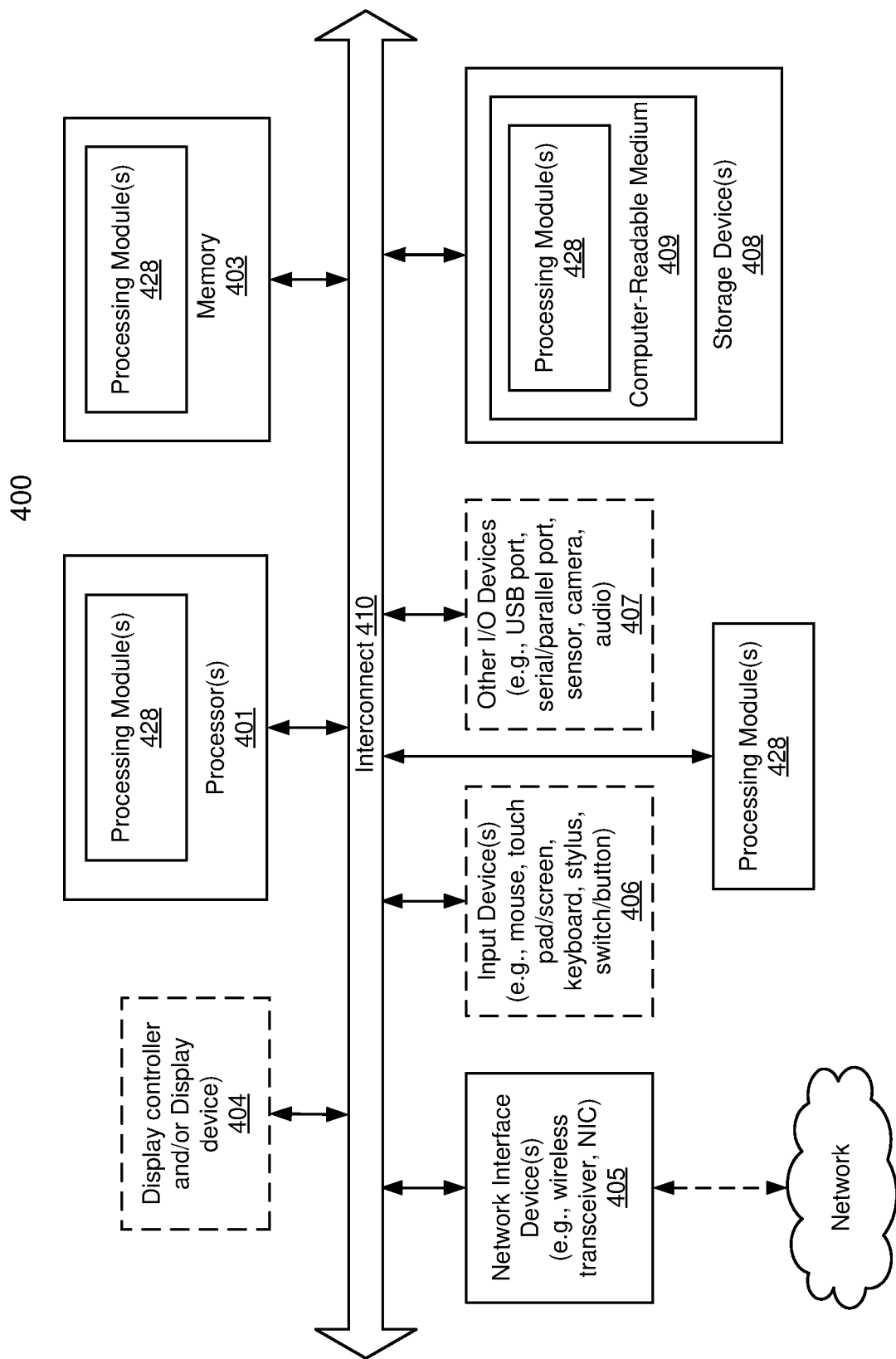
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a data processing system, the method comprising:
    obtaining, by hardware resources of the data processing system, first log in credentials associated with a first user of the data processing system, the hardware resources comprising a first hardware processor, the first hardware processor being configured to host an operating system of the data processing system;
    obtaining, by a management controller of the data processing system and based on the first log in credentials, a first identifier, the first identifier being associated with the first user, the management controller being a separate data processing system that is physically installed within the data processing system and comprises a second hardware processor, the second hardware processor being different and operates independently from the first processor, and the second hardware processor not being configured to host the operating system of the data processing system;
    providing, by the management controller and via an out of band communication channel, the first identifier to a server;
    obtaining, by the management controller and in response to the providing, a first user persona from the server, the first user persona comprising a first set of configurations for the data processing system based on historical behavior of the first user;
    providing, by the management controller, the first set of the configurations to the hardware resources; and
    performing, by the hardware resources, an action set to implement the first set of the configurations to place the hardware resources in a first operating state.

2. The method of claim 1, further comprising:
    obtaining, by the hardware resources, second log in credentials associated with a second user of the data processing system;
    obtaining, by the management controller and based on the second log in credentials, a second identifier, the second identifier being associated with the second user;
    providing, by the management controller and via the out of band communication channel, the second identifier to a server;
    obtaining, by the management controller and in response to the providing, a second user persona from the server, the second user persona comprising a second set of configurations for the data processing system based on historical behavior of the second user;
    providing, by the management controller, the second set of the configurations to the hardware resources; and
    performing, by the hardware resources, an action set to implement the second set of the configurations to place the hardware resources in a second operating state.

3. The method of claim 1, further comprising:
    monitoring, by the hardware resources, the first operating state to identify a change in the first operating state;
    updating, by the management controller, the first user persona based on the change in the first operating state to obtain an updated first user persona; and
    providing, by the management controller, the updated first user persona to the server.

4. The method of claim 1, wherein the first set of the configurations comprises at least one selected from a list consisting of:
    a security profile for the data processing system; and
    user preferences associated with the first user.

5. The method of claim 1, wherein performing the action set comprises:
    identifying, by the hardware resources, a location of the first user;
    selecting, by the hardware resources, a portion of the first set of the configurations based on the location; and
    modifying operation of the hardware resources based on the portion of the first set of the configurations.

6. The method of claim 1, wherein the data processing system comprises a network module adapted to separately advertise network endpoints for the management controller and the hardware resources, the network endpoints being usable by the server to address communications to the hardware resources and the management controller.

7. The method of claim 1, wherein the management controller and a network module of the data processing system are on separate power domains from the hardware resources so that the management controller and the network module are operable from receiving power from a power supply of the data processing system through a first power domain of the separate power domains while the hardware resources are inoperable from not receiving the power from the power supply through a second power domain of the separate power domains, the hardware resources comprising a central processing unit (CPU) of the data processing system as the first hardware processor.

8. The method of claim 6, wherein the out of band communication channel runs through the network module, and an in band communication channel that services the hardware resources also runs through the network module.

9. The method of claim 6, wherein the management controller hosts a transmission control protocol/internet protocol (TCP/IP) stack to facilitate network communications via the out of band communication channel.

10. A non-transitory machine-readable medium having instructions stored therein, which when executed by one or more processors contained within a data processing system, cause the one or more processors to perform operations for managing the data processing system, the operations comprising:
  obtaining, by hardware resources of the data processing system, first log in credentials associated with a first user of the data processing system, the hardware resources comprising a first hardware processor of the one or more processors, the first hardware processor being configured to host an operating system of the data processing system;
  obtaining, by a management controller of the data processing system and based on the first log in credentials, a first identifier, the first identifier being associated with the first user, the management controller being a separate data processing system that is physically installed within the data processing system and comprises a second hardware processor of the one or more processors, the second hardware processor being different and operates independently from the first processor, and the second hardware processor not being configured to host the operating system of the data processing system;
  providing, by the management controller and via an out of band communication channel, the first identifier to a server;
  obtaining, by the management controller and in response to the providing, a first user persona from the server, the first user persona comprising a first set of configurations for the data processing system based on historical behavior of the first user;
  providing, by the management controller, the first set of the configurations to the hardware resources; and
  performing, by the hardware resources, an action set to implement the first set of the configurations to place the hardware resources in a first operating state.

11. The non-transitory machine-readable medium of claim 10, wherein the operations further comprise:
  obtaining, by the hardware resources, second log in credentials associated with a second user of the data processing system;
  obtaining, by the management controller and based on the second log in credentials, a second identifier, the second identifier being associated with the second user;
  providing, by the management controller and via the out of band communication channel, the second identifier to a server;
  obtaining, by the management controller and in response to the providing, a second user persona from the server, the second user persona comprising a second set of configurations for the data processing system based on historical behavior of the second user;
  providing, by the management controller, the second set of the configurations to the hardware resources; and
  performing, by the hardware resources, an action set to implement the second set of the configurations to place the hardware resources in a second operating state.

12. The non-transitory machine-readable medium of claim 10, wherein the operations further comprise further comprise:
  monitoring, by the hardware resources, the first operating state to identify a change in the first operating state;
  updating, by the management controller, the first user persona based on the change in the first operating state to obtain an updated first user persona; and
  providing, by the management controller, the updated first user persona to the server.

13. The non-transitory machine-readable medium of claim 10, wherein the first set of the configurations comprises at least one selected from a list consisting of:
  a security profile for the data processing system; and
  user preferences associated with the first user.

14. The non-transitory machine-readable medium of claim 10, wherein performing the action set comprises:
  identifying, by the hardware resources, a location of the first user;
  selecting, by the hardware resources, a portion of the first set of the configurations based on the location; and
  modifying operation of the hardware resources based on the portion of the first set of the configurations.

15. The non-transitory machine-readable medium of claim 10, wherein the data processing system comprises a network module adapted to separately advertise network endpoints for the management controller and the hardware resources, the network endpoints being usable by the server to address communications to the hardware resources and the management controller.

16. A data processing system, comprising:
  hardware resources that comprise:
    a first hardware processor configured to host an operating system of the data processing system; and
    a memory coupled to the first hardware processor that store instructions, which when executed by the first hardware processor, cause the first hardware processor to perform first operations for managing the data processing system, the first operations comprising:
      obtaining, by the hardware resources, first log in credentials associated with a first user of the data processing system;
  a management controller comprising a second hardware processor, the management controller being a separate data processing system that is physically installed within the data processing system, the second hardware processor being different and operates independently from the first processor, the second hardware processor not being configured to host the operating system of the data processing system, and the second hardware processor being configured to perform second operations for managing the data processing system, the second operations comprising:
    obtaining, by the management controller and based on the first log in credentials, a first identifier, the first identifier being associated with the first user;
    providing, by the management controller and via an out of band communication channel, the first identifier to a server;
    obtaining, by the management controller and in response to the providing, a first user persona from the server, the first user persona comprising a first set of configurations for the data processing system based on historical behavior of the first user; and
    providing, by the management controller, the first set of the configurations to the hardware resources
  wherein the first operations further comprise:
    performing, by the hardware resources, an action set to implement the first set of the configurations to place the hardware resources in a first operating state.

17. The data processing system of claim 16, wherein the first operations further comprise:
  obtaining, by the hardware resources, second log in credentials associated with a second user of the data processing system;

wherein the second operations further comprise:
  obtaining, by the management controller based on the second log in credentials, a second identifier, the second identifier being associated with the second user;
  providing, by the management controller and via the out of band communication channel, the second identifier to a server;
  obtaining, by the management controller and in response to the providing, a second user persona from the server, the second user persona comprising a second set of configurations for the data processing system based on historical behavior of the second user; and
  providing, by the management controller, the second set of the configurations to the hardware resources, and
wherein the first operations further comprise:
  performing, by the hardware resources, an action set to implement the second set of the configurations to place the hardware resources in a second operating state.

18. The data processing system of claim 16,
wherein the first operations further comprise:
  monitoring, by the hardware resources, the first operating state to identify a change in the first operating state, and
wherein the second operations further comprise:
  updating, by the management controller, the first user persona based on the change in the first operating state to obtain an updated first user persona; and
  providing, by the management controller, the updated first user persona to the server.

19. The data processing system of claim 16, wherein the first set of the configurations comprises at least one selected from a list consisting of:
  a security profile for the data processing system; and
  user preferences associated with the first user.

20. The data processing system of claim 16, wherein performing the action set comprises:
  identifying, by the hardware resources, a location of the first user;
  selecting, by the hardware resources, a portion of the first set of the configurations based on the location; and
  modifying operation of the hardware resources based on the portion of the first set of the configurations.

* * * * *

UNITED STATES PATENT AND TRADEMARK OFFICE
CERTIFICATE OF CORRECTION

| | | |
|---|---|---|
| PATENT NO. | : 12,468,553 B2 | Page 1 of 1 |
| APPLICATION NO. | : 18/498302 | |
| DATED | : November 11, 2025 | |
| INVENTOR(S) | : Abeye Teshome et al. | |

It is certified that error appears in the above-identified patent and that said Letters Patent is hereby corrected as shown below:

In the Claims

Claim 12, Column 23, Lines 59-60, the text "wherein the operations further comprise further comprise" should instead read -- wherein the operations further comprise --.

Signed and Sealed this
Twentieth Day of January, 2026

John A. Squires
*Director of the United States Patent and Trademark Office*